US011862873B2

(12) United States Patent
Hamabe

(10) Patent No.: US 11,862,873 B2
(45) Date of Patent: Jan. 2, 2024

(54) ANTENNA DEVICE

(71) Applicant: Panasonic Intellectual Property Management Co., Ltd., Osaka (JP)

(72) Inventor: Taichi Hamabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 17/557,369

(22) Filed: Dec. 21, 2021

(65) Prior Publication Data

US 2022/0209412 A1 Jun. 30, 2022

(30) Foreign Application Priority Data

Dec. 28, 2020 (JP) ................................ 2020-219304

(51) Int. Cl.
*H01Q 9/04* (2006.01)
*H01Q 13/10* (2006.01)
*H01Q 21/06* (2006.01)

(52) U.S. Cl.
CPC ........... *H01Q 9/0407* (2013.01); *H01Q 13/10* (2013.01); *H01Q 21/064* (2013.01)

(58) Field of Classification Search
CPC ...... H01Q 9/04; H01Q 9/0407; H01Q 9/0414; H01Q 9/0445; H01Q 9/045; H01Q 13/08; H01Q 13/085; H01Q 13/10; H01Q 1/36; H01Q 1/38
See application file for complete search history.

(56) References Cited

U.S. PATENT DOCUMENTS 6,191,740 B1 * 2/2001 Kates ....................... H01Q 5/40 343/795
6,342,864 B1 * 1/2002 Muramoto ......... H01Q 21/0075 343/770
7,221,320 B2 * 5/2007 Sathath .................... H01Q 1/38 343/700 MS
9,466,886 B2 * 10/2016 Kashino ............... H01Q 13/106
(Continued)

FOREIGN PATENT DOCUMENTS

EP 1 108 616 6/2001
JP 03-148902 6/1991
JP 2006-135672 5/2006

OTHER PUBLICATIONS

Notice of Reasons for Refusal dated Dec. 20, 2022, in corresponding Japanese Patent Application No. 2020-219304, with English translation.

*Primary Examiner* — Jason Crawford
(74) *Attorney, Agent, or Firm* — Wenderoth, Lind & Ponack, L.L.P.

(57) ABSTRACT

An antenna device includes a first conductor corresponding to communication in a first frequency band, a ground conductor that faces the first conductor, and a second conductor that is disposed between the first conductor and the ground conductor, faces the first conductor and the ground conductor, and has a power supply point. The second conductor is disposed so as to face one end side of the first conductor in an upper-lower direction of the first conductor. The first conductor has a slot disposed at a position facing the other end side opposite to the second conductor, the slot corresponding to communication in a second frequency band that is different from the first frequency band.

4 Claims, 10 Drawing Sheets

(56) References Cited

U.S. PATENT DOCUMENTS

| | | | | |
|---|---|---|---|---|
| 2006/0097926 | A1 | 5/2006 | Fujii et al. | |
| 2009/0231215 | A1* | 9/2009 | Taura | H01Q 21/064<br>343/702 |
| 2012/0212384 | A1* | 8/2012 | Kam | H01Q 1/2283<br>343/834 |
| 2015/0349428 | A1* | 12/2015 | Kashino | H01Q 13/106<br>343/770 |
| 2015/0364823 | A1* | 12/2015 | Hashimoto | H01Q 9/0407<br>343/700 MS |
| 2019/0229421 | A1* | 7/2019 | Onaka | H01Q 9/045 |
| 2020/0365995 | A1* | 11/2020 | Hamabe | H01Q 9/045 |
| 2021/0021048 | A1* | 1/2021 | Da Silveira | H01Q 5/335 |
| 2021/0159598 | A1* | 5/2021 | Hamabe | H01Q 9/045 |
| 2021/0305701 | A1* | 9/2021 | Hamabe | H01Q 5/357 |
| 2022/0209412 | A1* | 6/2022 | Hamabe | H01Q 21/24 |

* cited by examiner

ANTENNA DEVICE

CROSS-REFERENCE TO RELATED APPLICATIONS

This application is based on and claims priority under 35 USC 119 from Japanese Patent Application No. 2020-219304 filed on Dec. 28, 2020, the contents of which are incorporated herein by reference.

TECHNICAL FIELD

The present disclosure relates to an antenna device.

BACKGROUND ART

JP-A-2006-135672 discloses a patch antenna including a dielectric substrate, a substantially rectangular radiation element formed of a conductor on the dielectric substrate, and a power supply line connected to a power supply point for supplying power to the radiation element. In this patch antenna, the power supply point has impedance matching the power supply line. Accordingly, antenna characteristics are improved.

SUMMARY OF INVENTION

The present disclosure is proposed in view of the circumstances in the related art described above, and an object of the present disclosure is to provide an antenna device that can improve antenna characteristics in a desired direction corresponding to a plurality of communication frequency bands.

Aspect of non-limiting embodiments of the present disclosure relates to provide an antenna device. The antenna device includes an antenna face on which a rectangular antenna conductor corresponding to communication in a first frequency is provided, a ground face that faces the antenna face and on which a ground conductor is provided, and a rectangular power supply face that is provided between the antenna face and the ground face, faces the antenna face and the ground face, and has a power supply point. The power supply point is provided at one end side of the power supply face in an upper-lower direction of the power supply face. The antenna conductor has a rectangular slot disposed at a position facing the other end side opposite to the power supply point of the power supply face, the rectangular slot corresponding to communication in a second frequency that is different from the first frequency.

According to the present disclosure, the antenna device can improve antenna characteristics in a desired direction corresponding to a plurality of communication frequency bands.

DESCRIPTION OF EMBODIMENTS

Background of the Present Disclosure

The patch antenna disclosed in JP-A-2006-135672 is applied to a frequency band of 60 GHz in use. A single frequency in use such as 60 GHz is assumed in JP-A-2006-135672, and JP-A-2006-135672 does not disclose a configuration of an antenna device (a so-called dual band antenna device) that can handle a plurality of different communication frequency bands (for example, two communication frequency bands such as a 2 GHz band and a 5 GHz band). In a configuration of a dual band antenna device, for example, separation accuracy of radio signals is required so that radio signals of respective communication frequency bands that can be handled do not interfere with one another.

Therefore, in the following embodiments, an example of an antenna device that can handle a plurality of communication frequency bands and can improve antenna characteristics in a desired direction will be described.

Hereinafter, embodiments specifically disclosing an antenna device according to the present disclosure will be described in detail with reference to the drawings as appropriate. Unnecessarily detailed description may be omitted. For example, detailed description of a well-known matter or repeated description of substantially the same configuration may be omitted. This is to avoid unnecessary redundancy in the following description and to facilitate understanding for those skilled in the art. It should be noted that the accompanying drawings and the following description are provided for a thorough understanding of the present disclosure by those skilled in the art, and are not intended to limit the subject matter recited in the claims.

First Embodiment

As an example of the antenna device according to the present disclosure, a patch antenna (in other words, a planar antenna or a microstrip antenna (MSA)) will be described as an example in the first embodiment. The patch antenna may be mounted on, for example, a seat monitor provided on a back surface side of a seat of an aircraft or the like. As will be described later, the patch antenna may be disposed on each of six surfaces of a hexahedral antenna for measuring an arrival direction of radio waves in a space (see FIG. 5). In this manner, a product on which the patch antenna is mounted or to which the patch antenna is applied is not particularly limited.

Figure 1:
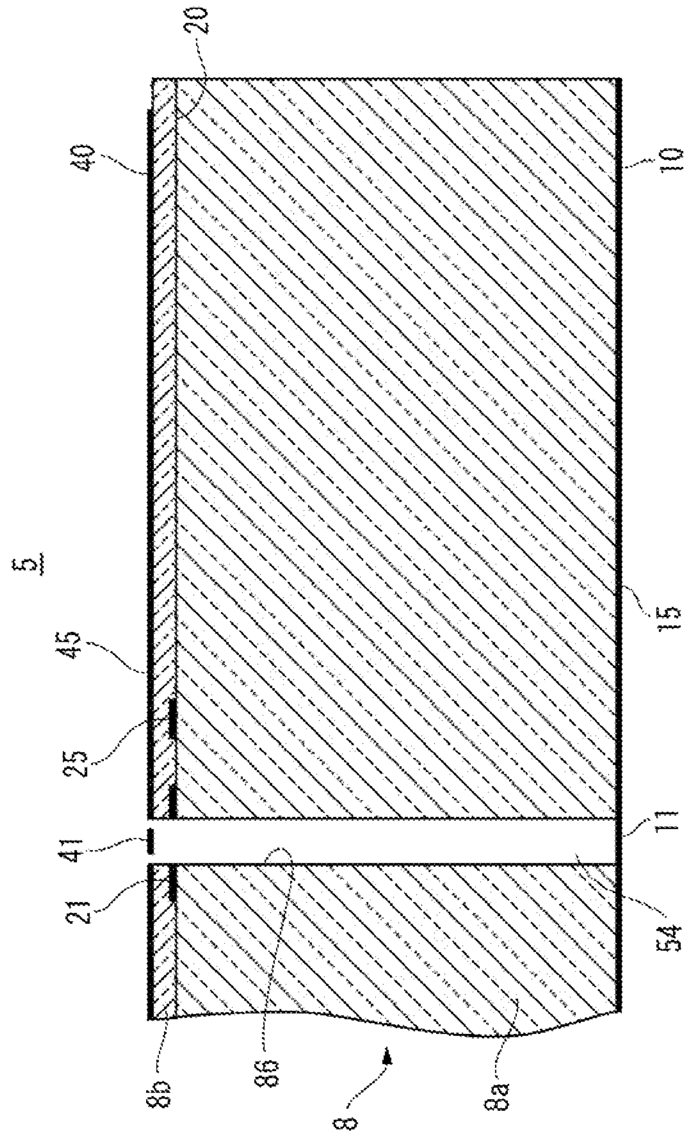
FIG. 1 is a cross-sectional view showing a stacked structure of a patch antenna according to a first embodiment as viewed in an I-I direction.

FIG. 1 is a cross-sectional view showing a stacked structure of a patch antenna 5 according to the first embodiment as viewed in an I-I direction. FIG. 1 shows a cross section viewed from a direction of arrows I-I in FIG. 2. The patch antenna 5 according to the first embodiment is an example of an antenna device that handles a plurality of communication frequency bands (for example, a dual band corresponding to communication of two different frequency bands), and that transmits (radiates), for example, a radio signal (in other words, radio waves) of a 2.45 GHz band represented by Wi-Fi (registered trademark) and transmits (radiates) a radio signal (in other words, radio waves) of a 5.3 GHz band represented by Wi-Fi (registered trademark).

As shown in FIG. 1, the patch antenna 5 includes a substrate 8 having a three-layer structure in which a ground face 10 is stacked on a lowermost layer, a power supply face 20 is stacked on an intermediate layer, and an antenna face 40 is stacked on an uppermost layer. The substrate 8 is a dielectric substrate formed of, for example, a dielectric having a high relative dielectric constant, such as Polyphenyleneoxide (PPO), and the substrate 8 has a multilayer structure in which a first substrate 8*a* and a second substrate 8*b* are stacked.

The ground face 10 is provided on a lower surface (back surface) side of the first substrate 8*a*, and has a larger area than the antenna face 40 and the power supply face 20. The antenna face 40 is provided on an upper surface (front surface) side of the second substrate 8*b*. The power supply face 20 is provided between the upper surface (front surface) side of the first substrate 8*a* and the lower surface (back surface) side of the second substrate 8*b* and faces the upper surface (front surface) side of the first substrate 8*a* and the lower surface (back surface) side of the second substrate 8*b*. Therefore, the patch antenna 5 according to the first embodiment supplies power to the antenna face 40 by bottom surface excitation from the power supply face 20 when the patch antenna 5 radiates radio waves. For example, a thickness of the entire substrate 8 is 3 mm, a thickness of the first substrate 8*a* is 2.9 mm, and a thickness of the second substrate 8*b* is 0.1 mm. The present invention is not limited thereto. A wireless communication circuit (not shown) that supplies a radio signal for supplying power to the patch antenna 5 is provided on a lower surface side of the substrate 8 (that is, a back surface of the ground face 10).

A via conductor 54 is provided in a through hole 86 that passes through the substrate 8 from the antenna face 40 disposed on the upper surface (front surface) of the substrate 8 to the ground face 10 disposed on the lower surface (back surface) side of the substrate 8. The via conductor 54 is formed into a cylindrical shape by filling, for example, a conductive material in the through hole 86. The via conductor 54 is a single conductor that electrically connects a contact 41 (that is, an upper end surface of the via conductor 54) formed on the antenna face 40 (specifically, a patch 45 serving as an example of a first conductor), a power supply point 21 (that is, an intermediate cross section of the via conductor 54) formed on the power supply face 20 (specifically, an end side of a stub conductor 25 serving as an example of a second conductor), and a contact 11 (that is, a lower end surface of the via conductor 54) formed on the ground face 10. The via conductor 54 is a power supply conductor for driving the antenna face 40 (specifically, the patch 45 described above or a slot SL1 (to be described later)) as a patch antenna. The contact 11 is connected to a power supply terminal (not shown) of a wireless communication circuit (not shown) disposed on the lower surface (back surface) side of the substrate 8.

Figure 2:
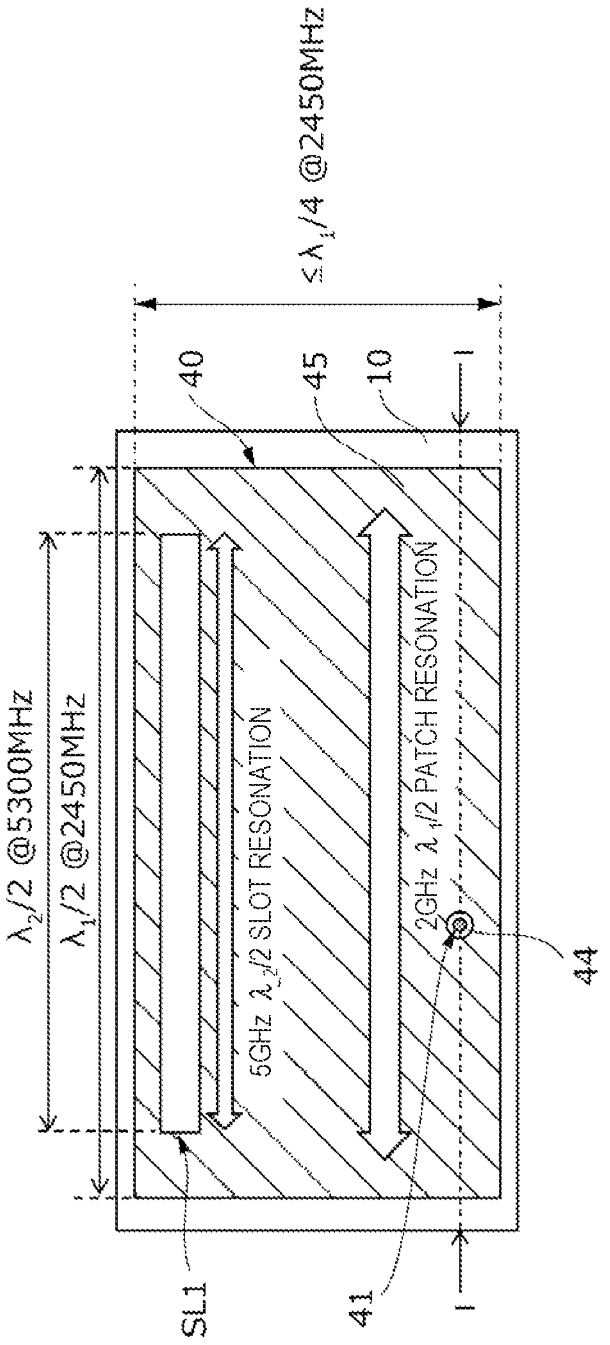
FIG. 2 is a plan view showing an antenna face of the patch antenna.

FIG. 2 is a plan view showing the antenna face 40 of the patch antenna 5. The antenna face 40 is provided with the patch 45 serving as an example of a rectangular first conductor corresponding to communication in a first frequency band (for example, 2.4 GHz band). The patch 45 is formed of, for example, a rectangular copper foil. A circular opening 44 is formed at one position on a surface of the patch 45, and the contact 41 (that is, a tip end surface of the via conductor 54) is exposed at the center of the opening 44. In other words, the patch 45 and the contact point 41 are not electrically connected to each other and are not short-circuited. The patch 45 and the contact 41 may be electrically connected to each other (that is, short-circuited). The patch 45 has characteristics of a parallel resonance circuit, and radiates (transmits) radio waves (radio signals) of a 2.4 GHz band in accordance with an excitation signal supplied from a wireless communication circuit (not shown) to the power supply point 21 of the power supply face 20. In other words, the patch antenna 5 radiates (transmits) radio waves (radio signals) of the first frequency band (for example, the 2.4 GHz band) by resonating in a portion other than the slot SL1 (see below) of the patch 45.

As shown in FIG. 2, the patch 45 has a length a (see FIG. 4C) in a long-side direction, which is designed on the assumption that the patch 45 is affected by a wavelength shortening rate effect based on a relative dielectric constant of the substrate 8 when the length of the patch 45 is ½ of a wavelength $\lambda_1$ (that is, $\lambda_1/2$) corresponding to the first frequency band (for example, 2.45 GHz). That is, the length a is equal to or less than $\lambda_1/2$. The patch 45 has a length b (see FIG. 4C) in a direction (short-side direction) orthogonal to the long-side direction, which is designed on the assumption that the patch 45 is affected by the wavelength shortening rate effect based on the relative dielectric constant of the substrate 8 when the length of the patch 45 is equal to or less than ¼ of the wavelength $\lambda_1$ (that is, $\lambda_1/4$) corresponding to the first frequency band (for example, 2.45 GHz). That is, the length b is equal to or less than $\lambda_1/4$. Here, the length a is, for example, 28 mm, and the length b is, for example, 14 mm.

The wavelength $\lambda_1$ indicates a length of a wavelength having a resonance frequency in the first frequency band (for example, 2.45 GHz) of the patch antenna 5, and the wavelength $\lambda_1$ is 122 mm when radio waves are transmitted in vacuum. That is, since a resonance due to a signal in the first frequency band (for example, 2.45 GHz) is generated at a portion of the patch 45 (that is, an electric field is concentrated), the length a in the lateral direction is designed in consideration of the fact that $\lambda_1/2$ is reduced from 61 (=122/2) mm to 28 mm due to a great influence of the relative dielectric constant of the substrate 8 serving as a transmission medium (that is, the wavelength shortening rate effect). Similarly, the length b in the vertical direction is designed in consideration of the fact that $\lambda_1/4$ is reduced from 30.5 mm to 14 mm due to an influence of the relative dielectric constant of the substrate 8 serving as a transmission medium (that is, the wavelength shortening rate effect).

As described above, the patch 45 of the patch antenna 5 is formed into a rectangular shape having (length in the long-side direction, length in the short-side direction)=(a, b) [mm: millimeter] (a>b), so that the long-side direction of the patch 45 is parallel to the long-side direction of the patch antenna 5 when the patch antenna 5 is mounted on a communication terminal such as a seat monitor or a hexahedral antenna (see the above description). Accordingly, when the wavelength $\lambda_1$ of the first frequency band (for example, 2.45 GHz) is set in accordance with the length of the patch antenna 5 in the long-side direction, horizontally polarized radio waves are radiated more strongly in communication of the first frequency band (for example, 2.45 GHz) compared with vertically polarized radio waves.

The patch 45 has the rectangular slot SL1 corresponding to communication of a second frequency band (for example, 5.3 GHz) different from the first frequency band at a position (see FIG. 2) facing the other end side opposite to the power supply point 21 of the power supply face 20. That is, the entire area of the patch 45 is not formed of a copper foil, and the slot SL1 is formed by cutting out the copper foil in a region having a certain area.

The slot SL1 has a length c (see FIG. 4C) in a long-side direction (in other words, a direction parallel to the long-side direction of the patch 45), which is designed on the assumption that the patch 45 is affected by the wavelength shortening rate effect based on the relative dielectric constant of the substrate 8 when the length c of the slot SL1 is ½ of a wavelength $\lambda_2$ (that is, $\lambda_2/2$) corresponding to the second frequency band (for example, 5.3 GHz). That is, the length c is equal to or less than $\lambda_2/2$. The slot SL1 has a length (for example, 1.5 mm) in a short-side direction (in other words, a direction parallel to the short-side direction of the patch 45). Here, the length c is, for example, 23 mm.

The wavelength $\lambda_2$ indicates a length of a wavelength having a resonance frequency in a second frequency band (for example, 5.3 GHz) of the patch antenna 5, and the wavelength $\lambda_2$ is 56 mm when radio waves are transmitted in vacuum. That is, since a resonance due to a signal in the second frequency band (for example, 5.3 GHz) is generated at a portion of the slot SL1 (that is, an electric field is concentrated), the length c in the lateral direction is designed in consideration of the fact that $\lambda_2/2$ is reduced from 28 (=56/2) mm to 23 mm due to an influence of the relative dielectric constant of the substrate 8 serving as a transmission medium (that is, the wavelength shortening rate effect). Since the first frequency band (for example, 2.45 GHz) resonates at the portion of the patch 45, the influence of the relative dielectric constant of the substrate 8 (that is, a wavelength shortening rate effect) is large, and since the second frequency band (for example, 5.3 GHz) resonates at the slot SL1, the influence of the relative dielectric constant of the substrate 8 (that is, a wavelength shortening rate effect) is few, and there is a difference in the wavelength shortening rate effects.

The slot SL1 is provided at a position away from the power supply point 21 by about a length of ¼ of the wavelength $\lambda_2$ (that is, $\lambda_2/4$) corresponding to the second frequency band (for example, 5.3 GHz). The length corresponding to $\lambda_2/4$ is designed on the assumption that the patch 45 is affected by the relative dielectric constant of the substrate 8 described above (that is, the wavelength shortening rate effect). Accordingly, compared with the communication in the first frequency band (for example, 2.45 GHz), resonance in a vertical direction (in other words, an upper-lower direction parallel to the short-side direction of the patch antenna 5) is likely to occur, an electric field is strong at a position of the slot SL1, and vertically polarized radio waves are radiated more strongly in the communication of the second frequency band (for example, 5.3 GHz) compared with the horizontally polarized radio waves.

Figure 3:
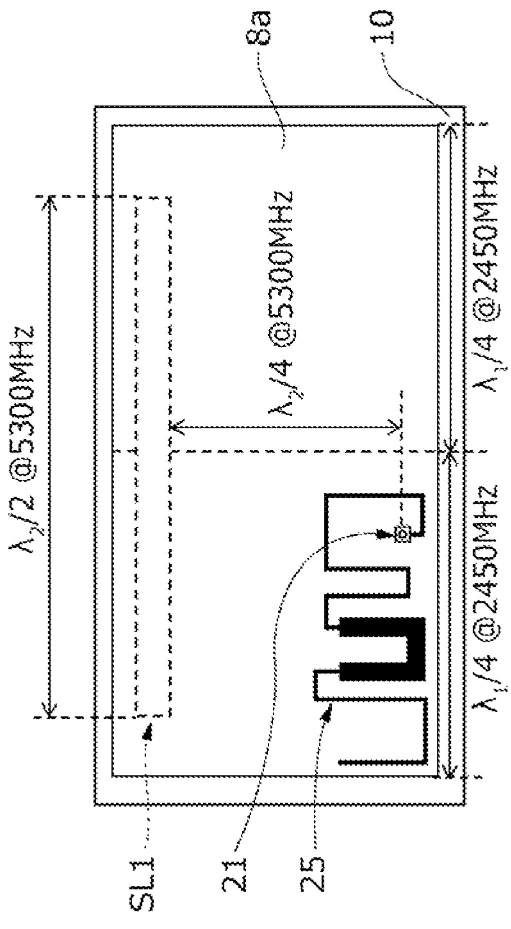
FIG. 3 is a plan view showing a power supply face of the patch antenna.

FIG. 3 is a plan view showing the power supply face 20 of the patch antenna 5. The power supply face 20 is provided with the stub conductor 25 serving as an example of a second conductor that can also be referred to as a power supply line. The stub conductor 25 has an impedance matching an impedance of the patch 45 suitable for the communication in the first frequency band (for example, 2.45 GHz), and has characteristics of a series resonant circuit connected in series with the patch 45 so as to match the impedance of the patch 45. That is, the stub conductor 25 is electrically coupled in series with the patch 45, so that a radiation reactance component of the patch antenna 5 can be brought close to zero.

The stub conductor 25 is provided with a transmission line portion including the power supply point 21 provided at one end side of the stub conductor 25 and a plurality of folded portions starting from the power supply point 21. The transmission line portion includes a line in which a plurality of transmission lines are connected in series. The entire length of the stub conductor 25 is, for example, $3\lambda_1/4$. The lengths (line lengths) of the plurality of transmission lines constituting the transmission line portion may not necessarily be the same. The plurality of transmission lines constituting the transmission line portion shown in FIG. 3 include two transmission lines each having a short line width and one transmission line having a large line width. Since the transmission line having a large line width is provided, it is possible to prevent an increase in the entire length of the stub conductor 25 compared with a case where the transmission line having a large line width is not provided.

A ground conductor 15 is formed on the ground face 10 (see FIG. 1). The ground conductor 15 is formed of a copper foil material, and is formed into a rectangular shape over substantially the entire lower surface (back surface) side of the substrate 8 (particularly, the first substrate 8*a*). A length of the entire circumference of the ground conductor 15 is set to be longer than a length of the entire circumference of the patch 45 by several wavelengths. When the entire circumference of the ground conductor 15 is long, the patch 45 is likely to resonate, and the length of the entire circumference of the patch 45 can also be set in accordance with the ground conductor 15.

Figure 4A:
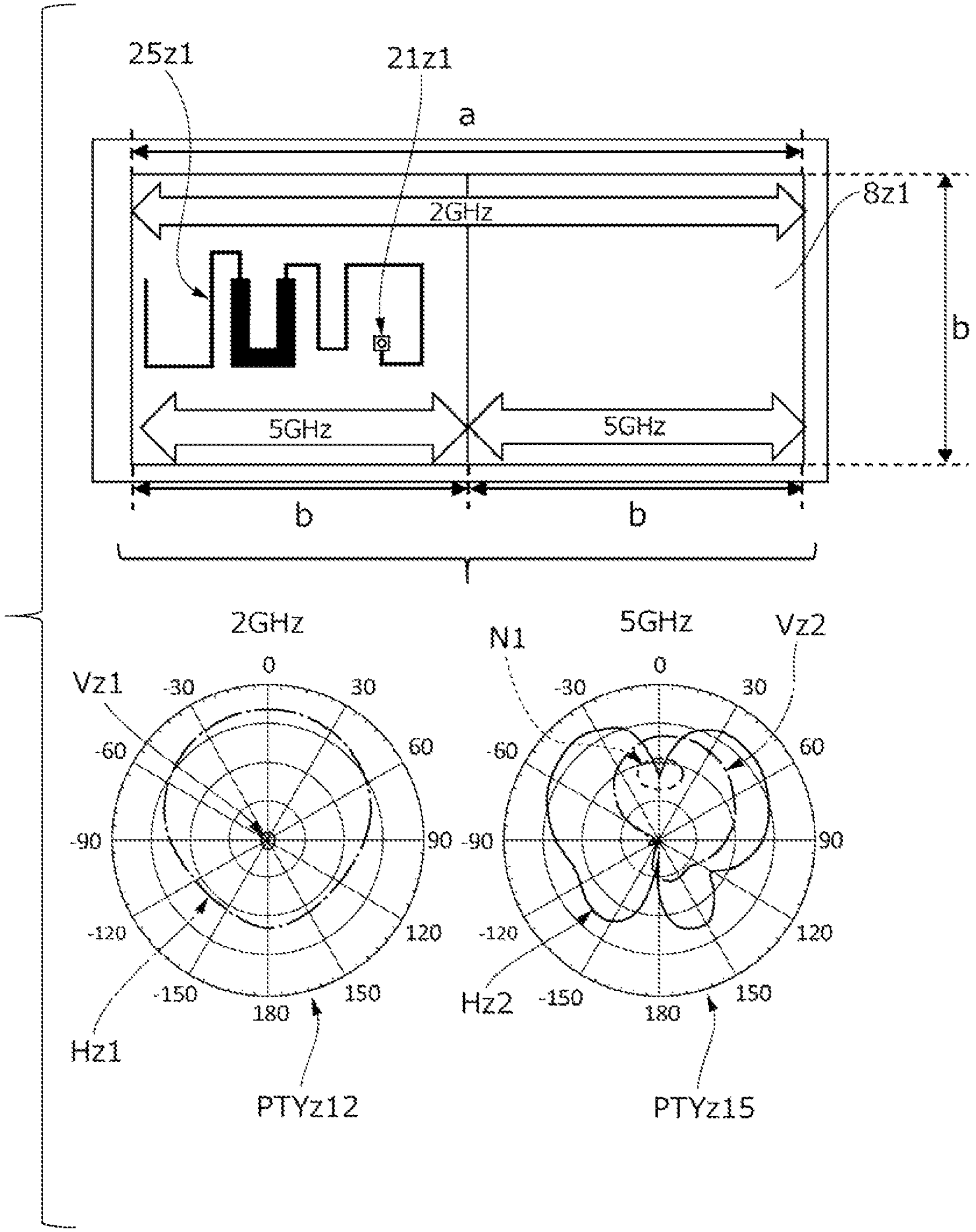
FIG. 4A is a plan view showing an upper surface (front surface) of a substrate on which a power supply point is disposed near a central portion of the substrate.
Figure 4B:
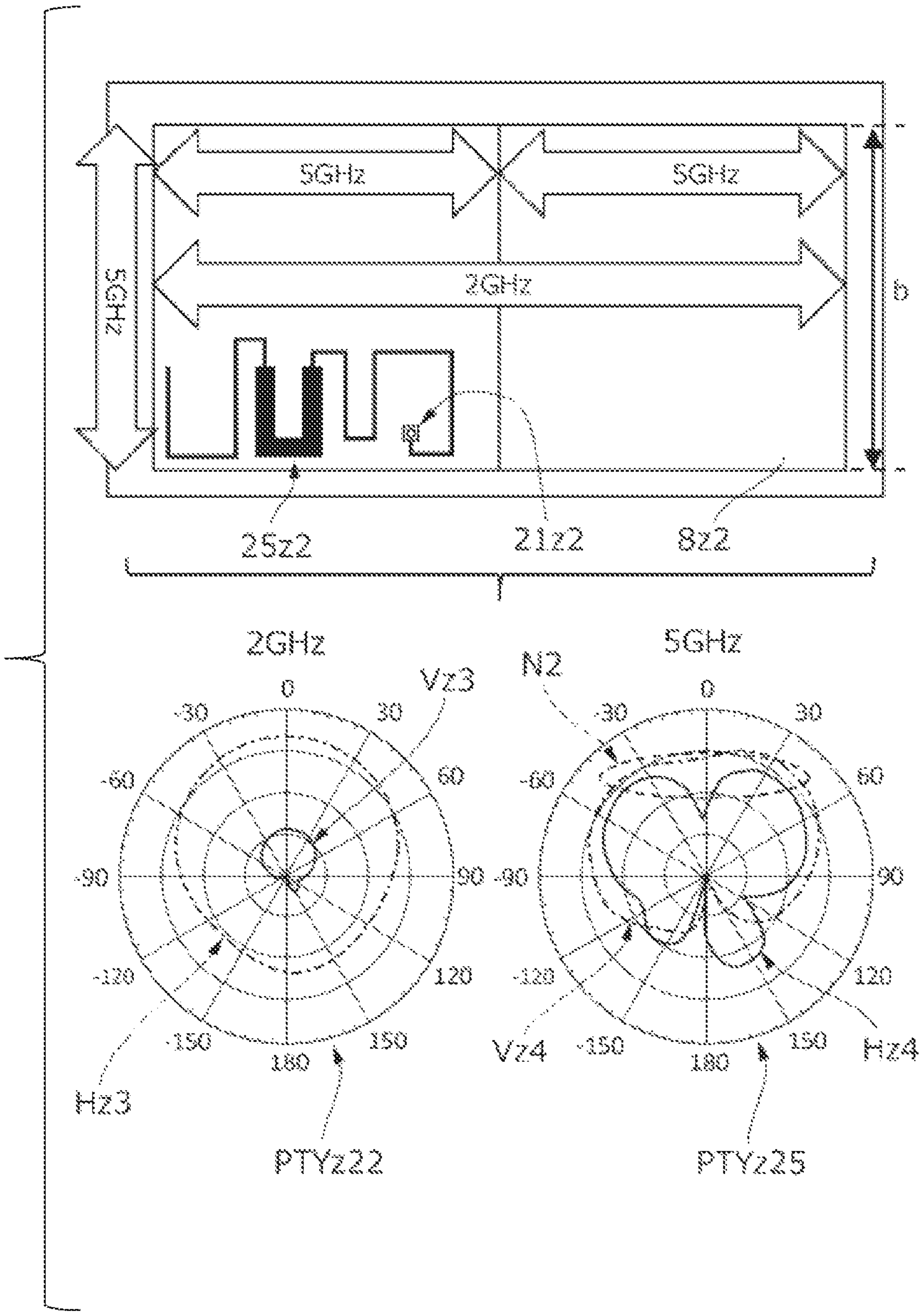
FIG. 4B is a plan view showing an upper surface (front surface) of a substrate on which a position of a power supply point is changed from a central portion to a position near an end portion.
Figure 4C:
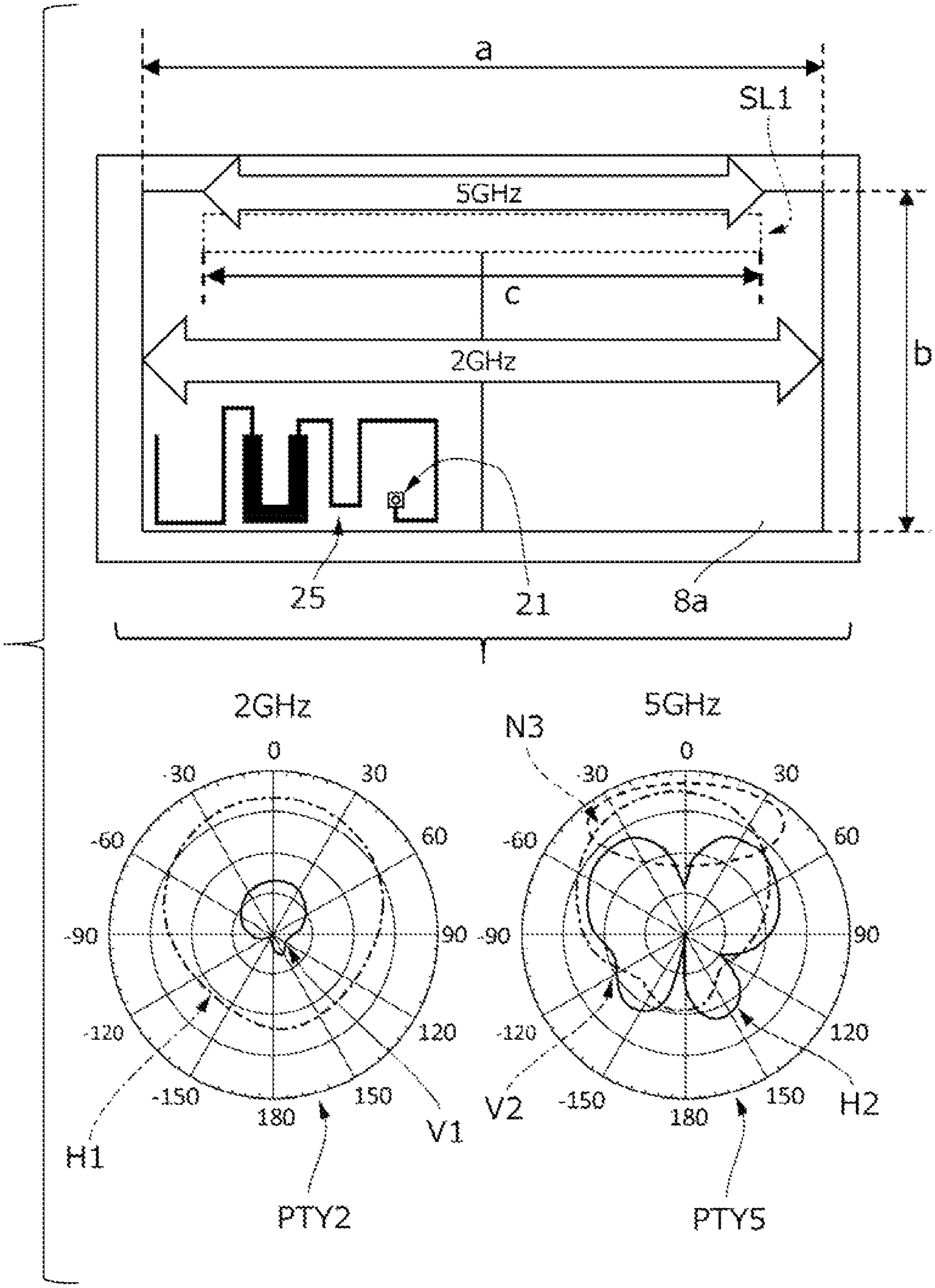
FIG. 4C is a plan view showing an upper surface (front surface) of a first substrate on which a position of a power supply point is changed from a central portion to a position near an end portion, and a slot is added at an opposite end portion side.

Next, a process of configuring the patch antenna 5 (see FIG. 4C) according to the first embodiment will be described based on a comparative example (see FIGS. 4A and 4B). FIG. 4A is a plan view showing an upper surface (front surface) of a substrate 8*z*1 on which a power supply point 21*z*1 is disposed near a central portion of the substrate 8*z*1. FIG. 4B is a plan view showing an upper surface (front surface) of a substrate 8*z*2 on which a position of a power supply point 21*z*2 is changed from a central portion to a position near an end portion. FIG. 4C is a plan view showing an upper surface (front surface) of the first substrate 8*a* on which the position of the power supply point 21 is changed from a central portion to a position near an end portion and the slot SL1 is added at an opposite end portion side.

Here, with reference to FIGS. 4A to 4C, simulation results of antenna characteristics (for example, radiation characteristics of horizontally polarized waves and vertically polarized waves) in a 2 GHz band and a 5 GHz band and study of the simulation results will be described with reference to configuration examples of the dual band patch antennas shown in FIGS. 4A, 4B, and 4C. The first substrate 8*a* and the stub conductor 25 shown in FIG. 4C are provided in the patch antenna 5 according to the first embodiment. In order to make the comparison description easy to understand, the lengths a in the long-side direction and the lengths b in the short-side direction of the substrate 8z1 (see FIG. 4A), the substrate 8z2 (see FIG. 4B), and the first substrate 8a (see FIG. 4C) are the same.

On the substrate 8z1 in FIG. 4A, the stub conductor 25z1 is disposed near the central portion of the upper surface (front surface) of the substrate 8z1 in the vertical direction (in other words, the short-side direction). The patch antenna including the substrate 8z1 resonates at the entire patch (not shown) having the length a in the long-side direction when radio waves of the 2 GHz band are radiated, and further resonates at two length b portions that are present in the long-side direction of the patch when radio waves of the 5 GHz band are radiated. Therefore, according to the configuration of the patch antenna shown in FIG. 4A, with regard to radiation characteristics PTYz12 and PTYz15 of the 2 GHz band and the 5 GHz band, horizontally polarized waves Hz1 are radiated more strongly than vertically polarized waves Vz1 in the 2 GHz band, and horizontally polarized waves Hz2 are radiated more strongly than vertically polarized waves Vz2 in the 5 GHz band in the same manner as in the 2 GHz band. In the 5 GHz band, since a resonance occurs at each of the two length b portions, a node N1 where an electric field is weak is generated in a desired direction (for example, a 0 degree direction which is a forward direction), and antenna characteristics of the horizontally polarized waves Hz2 deteriorate.

On the substrate 8z2 of FIG. 4B, the stub conductor 25z2 is disposed closer to an end portion (for example, a lower end portion) from a central portion in the vertical direction (in other words, the short-side direction) on the upper surface (front surface) of the substrate 8z2. The patch antenna including the substrate 8z2 resonates at the entire patch (not shown) having the length a in the long-side direction in the same manner when the radio waves of the 2 GHz band are radiated, and further resonates at each of the two length b portions that are present in the long-side direction of the patch and a length b portion in the short-side direction of a new patch when the radio waves of the 5 GHz band are radiated. That is, compared with the configuration in FIG. 4A, the resonance in the vertical direction is newly added in the 5 GHz band. Therefore, according to the configuration of the patch antenna shown in FIG. 4B, with regard to the radiation characteristics PTYz22 and PTYz25 of the 2 GHz band and the 5 GHz band, horizontally polarized waves Hz3 are radiated more strongly than vertically polarized waves Vz3 in the 2 GHz band, and a resonance in the vertical direction is added in the 5 GHz band, so that characteristics of vertically polarized waves are improved and vertically polarized waves Vz4 are radiated more strongly than horizontally polarized waves Hz4. However, in the 5 GHz band, a difference N2 between the vertically polarized waves Vz4 and the horizontally polarized waves Hz4 in a desired direction (for example, a 0 degree direction which is a forward direction) is small, and separation accuracy between the horizontally polarized waves and the vertically polarized waves deteriorates.

On the first substrate 8a in FIG. 4C, the stub conductor 25 is disposed closer to an end portion (for example, a lower end portion) from a central portion in the vertical direction (in other words, the short-side direction) on the upper surface (front surface) of the first substrate 8a, and the slot SL1 is disposed at a position of the patch 45 that faces a position (see FIGS. 2 and 3) away from the power supply point 21 by $\lambda_2/4$. The patch antenna 5 including the power supply face 20 provided on the upper surface (front surface) of the first substrate 8a resonates at a portion other than the slot SL1 of the patch 45 that has the length a in the long-side direction in the same manner when the radio waves of the 2 GHz band are radiated, and further resonates at a length c portion in the long-side direction of the slot SL1 when the radio waves of the 5 GHz band are radiated. That is, compared with the configuration in FIG. 4B, the resonance in the slot SL1 is dominant in the 5 GHz band. Therefore, according to the configuration of the patch antenna 5 shown in FIG. 4C, with regard to radiation characteristics PTY2 and PTYS of the 2 GHz band and the 5 GHz band, horizontally polarized waves H1 are radiated more strongly than vertically polarized waves V1 in the 2 GHz band, and a resonance in the slot SL1 is added in the 5 GHz band, so that characteristics of vertically polarized waves are greatly improved and vertically polarized waves V2 are radiated more strongly than horizontally polarized waves H2. Accordingly, in the 5 GHz band, a difference N3 between the vertically polarized waves V2 and the horizontally polarized waves H2 is increased in a desired direction (for example, a 0 degree direction which is a forward direction), separation accuracy between the horizontally polarized waves and the vertically polarized waves is improved, and antenna characteristics are improved.

Figure 5:
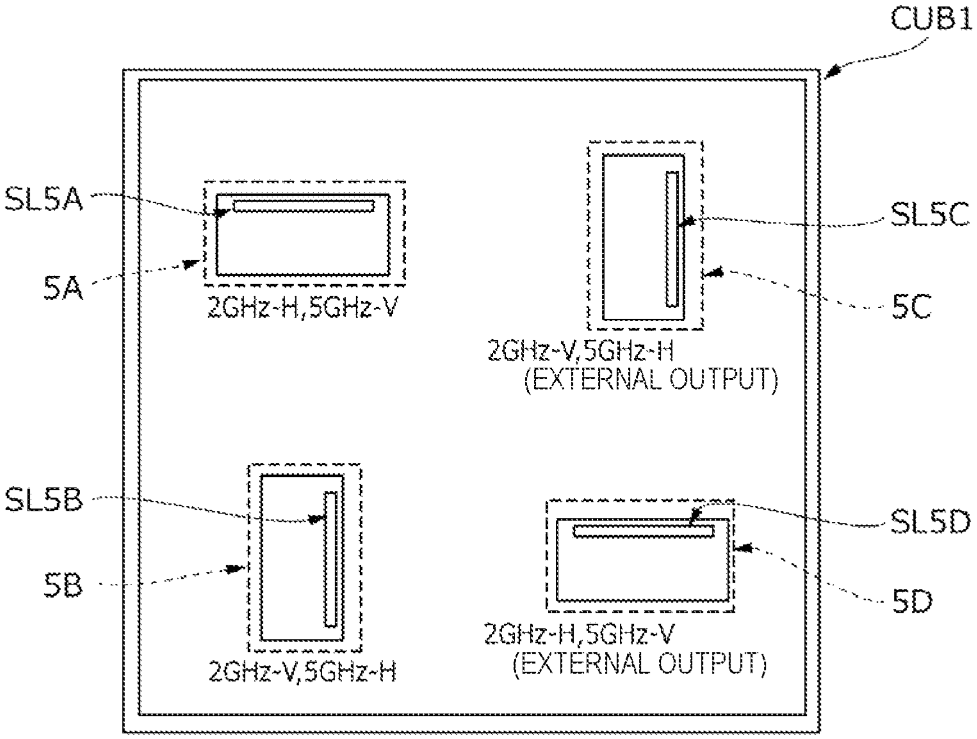
FIG. 5 is a plan view showing one face of a hexahedral antenna in which a plurality of patch antennas are arranged apart from one another in different long-side directions of slots.
Figure 6:
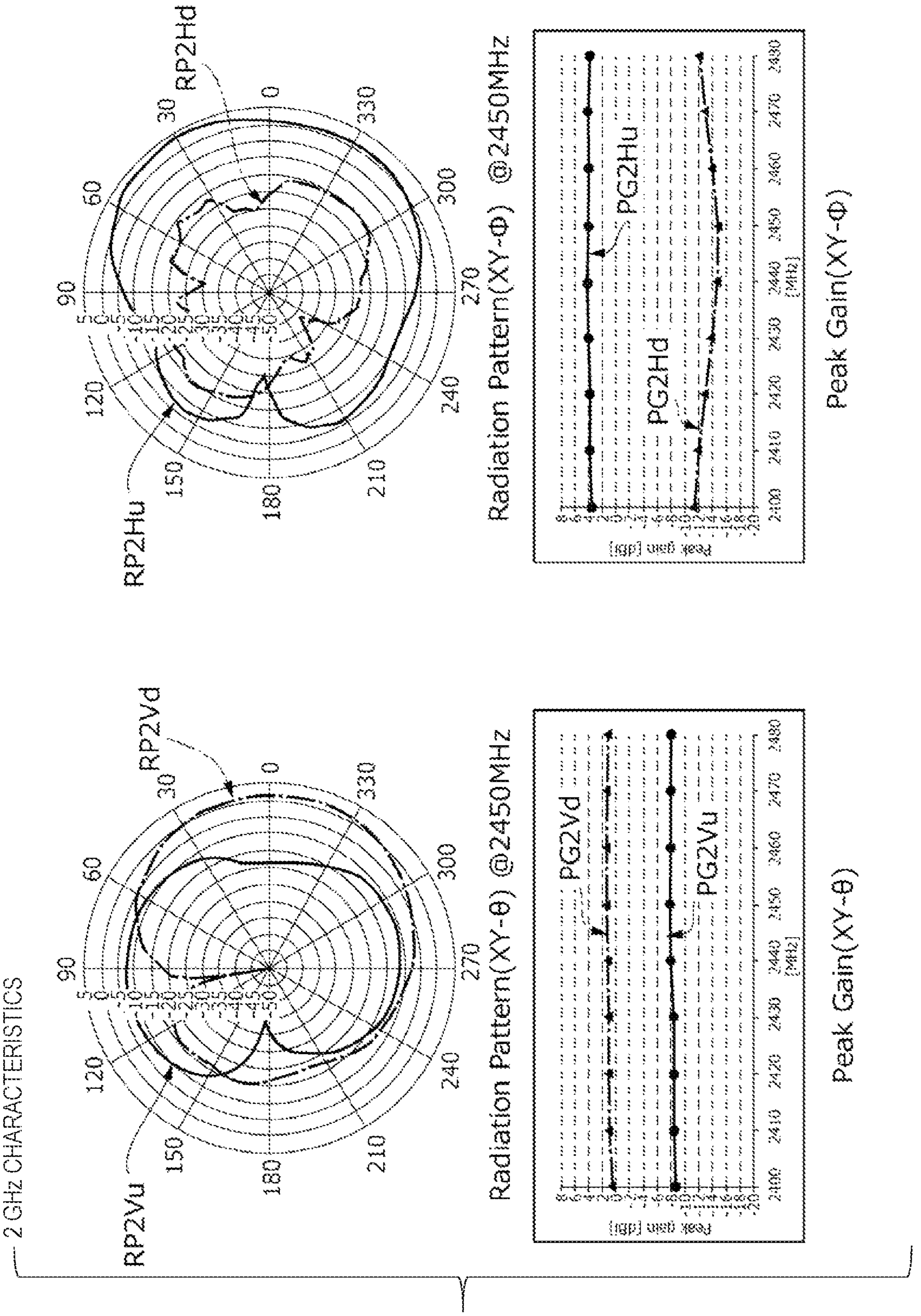
FIG. 6 is a diagram showing an example of antenna characteristics in a 2 GHz band of the arrangement in FIG. 5.
Figure 7:
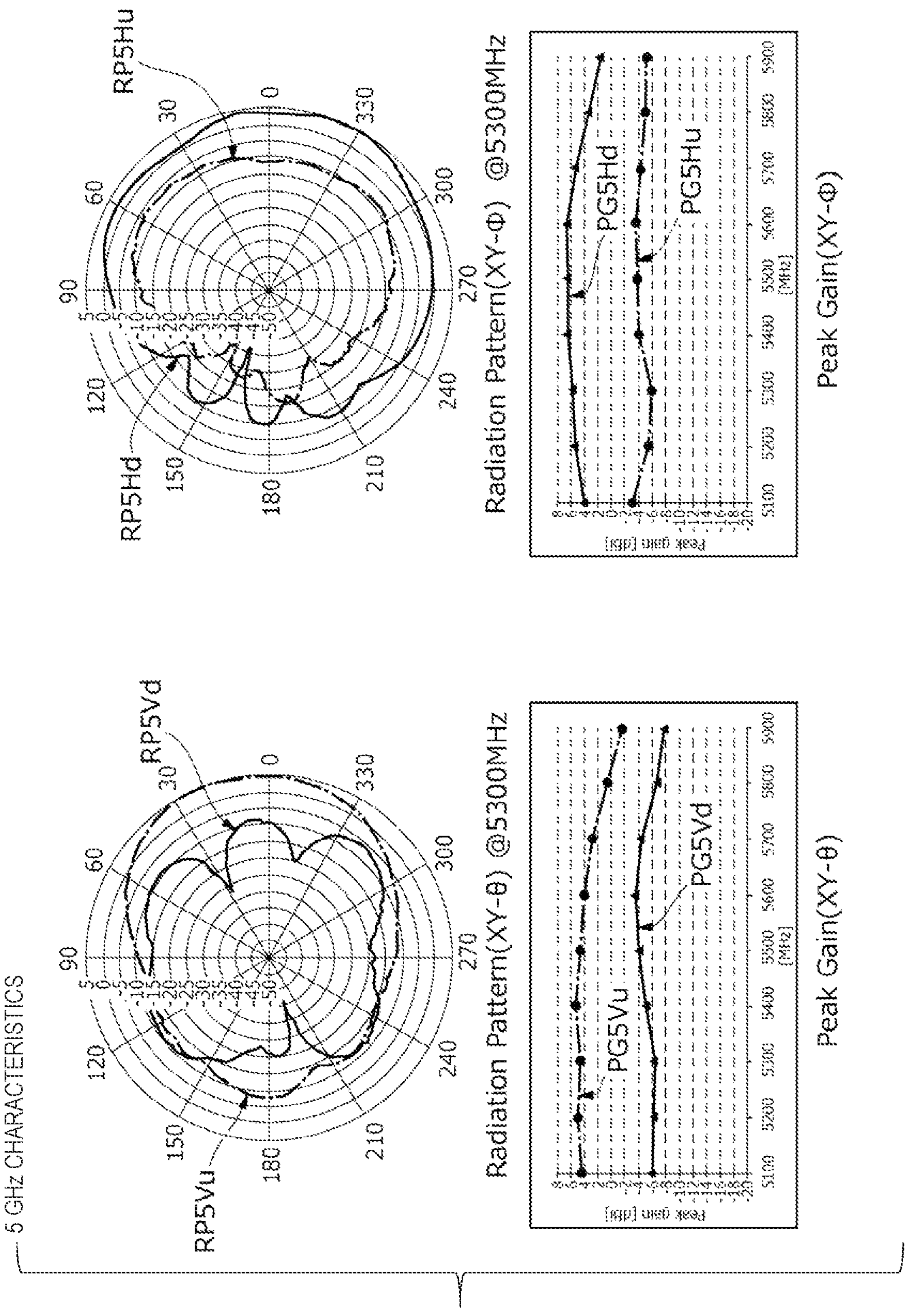
FIG. 7 is a diagram showing an example of antenna characteristics in a 5 GHz band of the arrangement in FIG. 5.

Next, antenna characteristics in a case where a plurality of (for example, two) patch antennas 5 according to the first embodiment are arranged on a surface constituting a hexahedral antenna will be described with reference to FIGS. 5 to 7. FIG. 5 is a plan view showing a surface CUB1 of a hexahedral antenna in which a plurality of patch antennas are arranged apart from one another in different long-side directions of slots. FIG. 6 is a diagram showing an example of antenna characteristics in the 2 GHz band of the arrangement in FIG. 5. FIG. 7 is a diagram showing an example of antenna characteristics in the 5 GHz band of the arrangement in FIG. 5.

A total of four patch antennas 5 are arranged on the surface CUB1 of the hexahedral antenna shown in FIG. 5. Specifically, a first patch antenna 5A is disposed horizontally at an upper left side in FIG. 5, and a second patch antenna 5B is disposed vertically at a lower left side in FIG. 5. A third patch antenna 5C is disposed vertically at an upper right side in FIG. 5, and a fourth patch antenna 5D is disposed horizontally at a lower right side in FIG. 5. The third patch antenna 5C and the fourth patch antenna 5D are provided for external output.

In the first patch antenna 5A and the second patch antenna 5B, long-side directions of slots SL5A and SL5B are respectively parallel to long-side directions of the first patch antenna 5A and the second patch antenna 5B. The second patch antenna 5B is disposed in a manner in which the first patch antenna 5A is rotated clockwise by 90 degrees. In order to prevent signal interference as much as possible, the first patch antenna 5A to the fourth patch antenna 5D are disposed apart from one another, the first patch antenna 5A and the fourth patch antenna 5D are disposed in the same direction, and the second patch antenna 5B and the third patch antenna 5C are disposed in the same direction.

Here, antenna characteristics (for example, radiation characteristics and peak gain characteristics) when a radio signal in the 2 GHz band is radiated will be described with reference to FIG. 6 by taking the first patch antenna 5A and the second patch antenna 5B as examples.

According to FIG. 6 (that is, the 2 GHz band), when peak gain characteristics PG2Vu of vertically polarized waves of the first patch antenna 5A and peak gain characteristics PG2Vd of vertically polarized waves of the second patch antenna 5B are compared with each other, the peak gain of the second patch antenna 5B is higher than the peak gain of the first patch antenna 5A. Therefore, it can be seen that the second patch antenna 5B radiates stronger vertically polarized waves than the first patch antenna 5A. When radiation characteristics RP2Vu of the vertically polarized waves of the first patch antenna 5A and radiation characteristic RP2Vd of the vertically polarized waves of the second patch antenna 5B are compared with each other, the second patch antenna 5B radiates stronger vertically polarized waves than the first patch antenna 5A in a desired direction (for example, a 0 degree direction which is a forward direction). This is because the long-side direction of the patch of the first patch antenna 5A is arranged horizontally (so-called horizontally long), and the long-side direction of the patch of the second patch antenna 5B is arranged vertically (so-called vertically long).

When peak gain characteristics PG2Hu of horizontally polarized waves of the first patch antenna 5A and peak gain characteristics PG2Hd of horizontally polarized waves of the second patch antenna 5B are compared with each other, the peak gain of the first patch antenna 5A is higher than the peak gain of the second patch antenna 5B. Therefore, it can be seen that the first patch antenna 5A radiates stronger horizontally polarized waves than the second patch antenna 5B. When radiation characteristics RP2Hu of the horizontally polarized waves of the first patch antenna 5A and radiation characteristics RP2Hd of the horizontally polarized waves of the second patch antenna 5B are compared with each other, the first patch antenna 5A radiates stronger horizontally polarized waves than the second patch antenna 5B in a desired direction (for example, the 0 degree direction which is the forward direction). This is because the long-side direction of the patch of the first patch antenna 5A is arranged horizontally (so-called horizontally long), and the long-side direction of the patch of the second patch antenna 5B is arranged vertically (so-called vertically long).

According to FIG. 7 (that is, the 5 GHz band), when peak gain characteristics PG5Vu of the vertically polarized waves of the first patch antenna 5A and peak gain characteristics PG5Vd of the vertically polarized waves of the second patch antenna 5B are compared with each other, the peak gain of the first patch antenna 5A is higher than the peak gain of the second patch antenna 5B. Therefore, it can be seen that the first patch antenna 5A radiates stronger vertically polarized waves than the second patch antenna 5B. When radiation characteristics RP5Vu of the vertically polarized waves of the first patch antenna 5A and radiation characteristics RP5Vd of the vertically polarized waves of the second patch antenna 5B are compared with each other, the first patch antenna 5A radiates stronger vertically polarized waves than the second patch antenna 5B in a desired direction (for example, a 0 degree direction which is a forward direction). This is because the long-side direction of the slot of the first patch antenna 5A is formed horizontally (so-called horizontally long), and the long-side direction of the slot of the second patch antenna 5B is formed vertically (so-called vertically long).

When peak gain characteristics PG5Hu of the horizontally polarized waves of the first patch antenna 5A and peak gain characteristics PG5Hd of the horizontally polarized waves of the second patch antenna 5B are compared with each other, the peak gain of the second patch antenna 5B is higher than the peak gain of the first patch antenna 5A. Therefore, it can be seen that the second patch antenna 5B radiates stronger horizontally polarized waves than the first patch antenna 5A. When radiation characteristics RP5Hu of the horizontally polarized waves of the first patch antenna 5A and radiation characteristics RP5Hd of the horizontally polarized waves of the second patch antenna 5B are compared with each other, the second patch antenna 5B radiates stronger horizontally polarized waves than the first patch antenna 5A in a desired direction (for example, the 0 degree direction which is the forward direction). This is because the long-side direction of the slot of the first patch antenna 5A is formed horizontally (so-called horizontally long), and the long-side direction of the slot of the second patch antenna 5B is formed vertically (so-called vertically long).

As described above, the patch antenna 5 according to the first embodiment includes a rectangular first conductor (for example, the patch 45) corresponding to communication (for example, wireless communication) of a first frequency band (for example, 2.45 GHz), the ground conductor 15 facing the first conductor (for example, the patch 45), and a rectangular second conductor (for example, the stub conductor 25) that is disposed between the first conductor (for example, the patch 45) and the ground conductor 15, faces the first conductor (for example, the patch 45) and the ground conductor 15, and has the power supply point 21. The second conductor (for example, the stub conductor 25) is provided in a manner of facing one end side in the upper-lower direction of the first conductor (for example, the patch 45). The first conductor (for example, the patch 45) is provided, at a position facing the other end side opposite to the second conductor (for example, the stub conductor 25), with the rectangular slot SL1 corresponding to communication of a second frequency band (for example, 5.3 GHz) that is different from the first frequency band.

Accordingly, the patch antenna 5 resonates at the patch 45 in the wireless communication of the first frequency band (for example, 2.45 GHz), and resonates at the slot SL1 in the wireless communication of the second frequency band (for example, 5.3 GHz), so that antenna characteristics (for example, one of the horizontally polarized waves and the vertically polarized waves has a higher gain than the other one for each frequency band) in a desired direction (for example, a forward direction where a user is present) corresponding to a plurality of communication frequency bands can be improved. For example, a communication terminal equipped with the patch antenna 5 may be used in a closed space such as an aircraft. However, since radio waves are likely to be reflected and the radio waves are likely to become pitch waves in a closed space, it is desirable that not only gain characteristics of the horizontally polarized waves but also gain characteristics of the vertically polarized waves are high. In particular, since there may be a user (for example, a passenger in an aircraft) in front of the communication terminal, one of the horizontally polarized waves and the vertically polarized waves can be radiated more strongly than the other one for each communication frequency by mounting the dual band patch antenna 5, and it is expected to improve usability.

The first frequency band (for example, 2.45 GHz) corresponding to the first conductor (for example, patch 45) is lower than the second frequency band (for example, 5.3 GHz) corresponding to the slot SL1. Accordingly, in the patch antenna 5, since the first conductor (for example, the patch 45) can resonate at a portion having a large area, the horizontally polarized waves can be radiated more strongly than the vertically polarized waves, and further, since the slot SL1 can resonate at a position away from the power supply point 21 by about $\lambda_2/4$ in the vertical direction (the short-side direction of the patch 45), the vertically polarized waves can be radiated more strongly than the horizontally polarized waves. Therefore, the patch antenna 5 can improve separation accuracy between the horizontally polarized waves and the vertically polarized waves in both 2 GHz and 5 GHz (that is, in dual bands), and can improve antenna characteristics.

The slot SL1 has a length equal to or less than ½ of the wavelength $\lambda_2$ corresponding to the second frequency band (for example, 5.3 GHz) in a direction parallel to the long-side direction of the first conductor (for example, the patch 45). The first conductor (for example, the patch 45) has a length equal to or less than ½ of the wavelength $\lambda_1$ corresponding to the first frequency band (for example, 2.45 GHz) in a direction parallel to the long-side direction of the first conductor (for example, the patch 45). Accordingly, a resonance in the vertical direction (in other words, the upper-lower direction parallel to the short-side direction of the patch antenna 5) is likely to occur, an electric field at the position of the slot SL1 is strong, and the vertically polarized radio waves are radiated more strongly in the communication of the second frequency band (for example, 5.3 GHz) compared with the horizontally polarized radio waves.

The slot SL1 is disposed at a position on the first conductor (for example, the patch 45) that faces a position away from the power supply point 21 by a distance of ¼ of the wavelength $\lambda_2$ corresponding to the second frequency band (for example, 5.3 GHz). Accordingly, the slot SL1 is disposed in the patch 45 that faces a position away from the power supply point 21 by about $\lambda_2/4$, so that an electric field is likely to be concentrated in the slot SL1, and antenna characteristics (for example, gain) in a desired direction (for example, a forward direction in which a user is present) are improved.

The second conductor further includes the stub conductor 25 having an impedance matching an impedance of the first conductor (for example, the patch 45). The first conductor (for example, the patch 45) is electrically connected to the stub conductor 25 via the power supply point 21 disposed at one end side of the stub conductor 25. Accordingly, the stub conductor 25 is electrically coupled in series with the patch 45 in the patch antenna 5, so that a radiation reactance component of the patch antenna 5 can be brought close to zero, and a radio wave frequency band in which the patch antenna 5 can be operated can be widened.

Modification of First Embodiment

Figure 8:
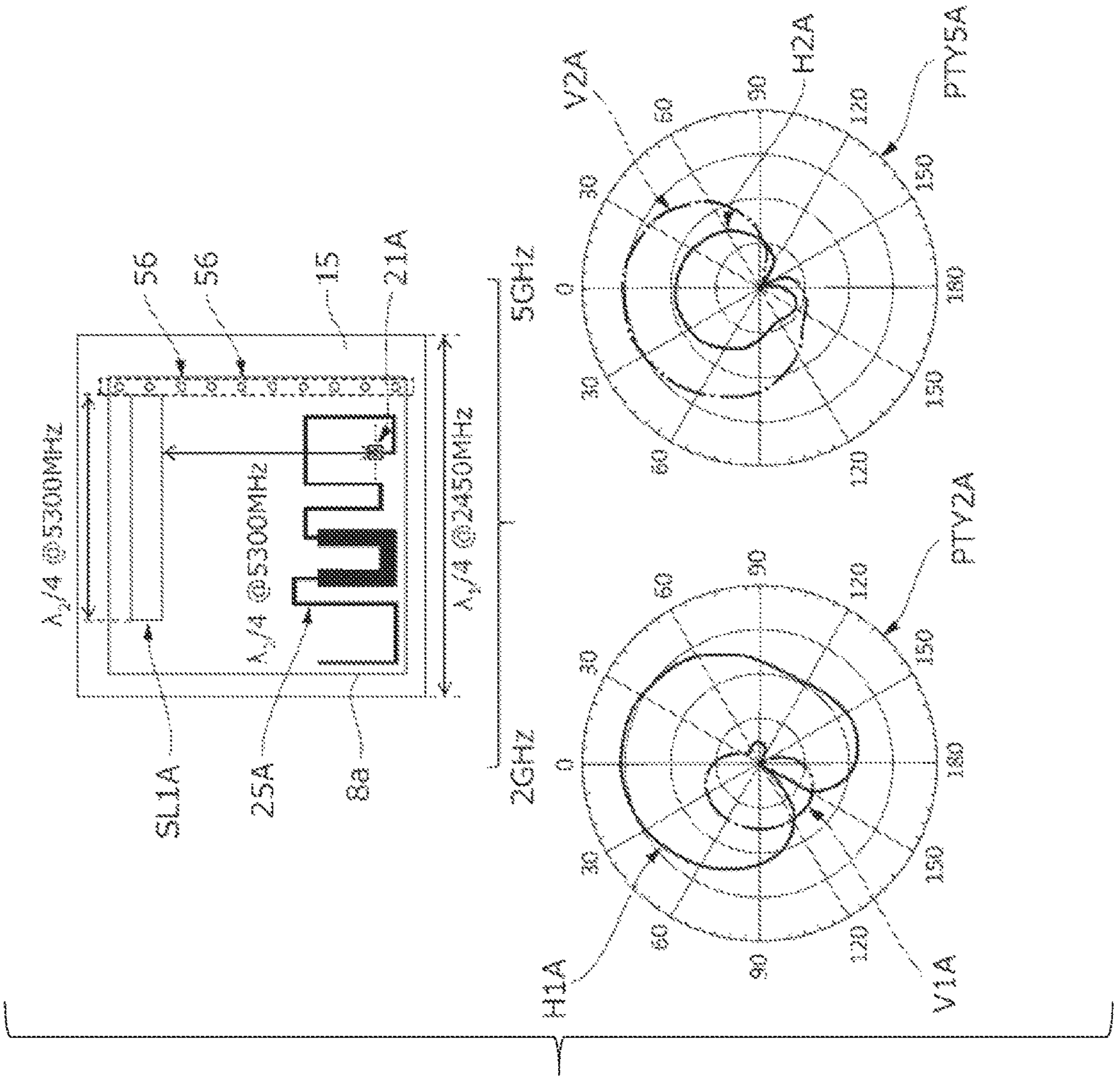
FIG. 8 is a diagram showing an example of antenna characteristics and an upper surface (front surface) of a first substrate of a patch antenna according to a modification of the first embodiment in a plan view.

An example of a patch antenna for further reducing a size of the patch antenna 5 according to the first embodiment will be described as a modification of the first embodiment by referring to FIG. 8. FIG. 8 is a diagram showing an example of antenna characteristics and the upper surface (front surface) of the first substrate 8*a* of a patch antenna according to the modification of the first embodiment in a plan view. Also in the modification of the first embodiment, similarly, the first substrate 8*a* and a first conductor (for example, a patch, not shown in FIG. 8) provided on the first substrate 8*a* are disposed in a manner of facing each other, and a ground face 10A has a larger area portion than the first conductor (for example, the patch 45) in the patch antenna. The first substrate 8*a* in FIG. 8 has, for example, ½ of a volume of the first substrate 8*a* in FIG. 2, and a plurality of via conductors 56 are arranged in a line at a right side of the first substrate 8*a*. That is, in the modification of the first embodiment, an arrangement of a slot SL1A and positions of a stub conductor 25A and a power supply point 21A are the same as those of the patch antenna 5 according to the first embodiment. Therefore, detailed description thereof will be omitted.

The via conductor 56 is a conductor that electrically connects a patch (an example of a first conductor) formed on an antenna face of the patch antenna according to the modification of the first embodiment and a ground conductor provided on the ground face 10A, and the plurality of via conductors 56 are provided at equal intervals in a manner of being arranged in a line (see FIG. 8). A plurality of through holes are formed in the first substrate 8*a* through which the via conductors 56 are inserted.

Therefore, according to the configuration of the patch antenna according to the modification of the first embodiment shown in FIG. 8C, the size of the patch antenna can be reduced compared with the patch antenna 5 according to the first embodiment, and with regard to radiation characteristics PTY2A and PTY5A of the 2 GHz band and the 5 GHz band, similar to the patch antenna 5 according to the first embodiment, horizontally polarized waves H1A are radiated more strongly than vertically polarized waves V1A in the 2 GHz band, and since a resonance at the slot SL1A is added in the 5 GHz, characteristics of vertically polarized waves are greatly improved and vertically polarized waves V2A are radiated more strongly than horizontally polarized waves H2A. Accordingly, in the 5 GHz band, a difference between the vertically polarized waves V2A and the horizontally polarized waves H2A is increased in a desired direction (for example, a 0 degree direction which is a forward direction), separation accuracy between the horizontally polarized waves and the vertically polarized waves is improved, and antenna characteristics are improved.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the above-described embodiments may be combined optionally within a range not departing from the spirit of the invention.

For example, an example of a use case in which the patch antenna 5 according to the first embodiment or the modification of the first embodiment is applied to an antenna of a transmission device that transmits radio waves has been described above, the patch antenna 5 may be applied to an antenna of a reception device that receives radio waves.

The present disclosure is useful as an antenna device that can improve antenna characteristics in a desired direction corresponding to a plurality of communication frequency bands.

What is claimed is:

1. An antenna device comprising:

a first conductor corresponding to communication in a first frequency band;

a ground conductor that faces the first conductor; and a second conductor that is disposed between the first conductor and the ground conductor, faces the first conductor and the ground conductor, and has a power supply point, wherein the second conductor is disposed so as to face one end side of the first conductor in an upper-lower direction of the first conductor, wherein the first conductor has a slot disposed at a position facing another end side opposite to the second conductor, the slot corresponding to communication in a second frequency band that is different from the first frequency band, wherein the slot has a length equal to or less than ½ of a wavelength corresponding to the second frequency band in a direction parallel to a long-side direction of the first conductor, and wherein the first conductor has a length equal to or less than ½ of a wavelength corresponding to the first frequency band in the direction parallel to the long-side direction of the first conductor.

2. The antenna device according to claim 1, wherein the first frequency band corresponding to the first conductor is lower than the second frequency band corresponding to the slot.

3. The antenna device according to claim 1, wherein the slot is disposed at a position on the first conductor that faces a position away from the power supply point by a distance of ¼ of the wavelength corresponding to the second frequency band.

4. The antenna device according to claim 1, wherein the second conductor includes a stub conductor having an impedance matching an impedance of the first conductor, and wherein the first conductor is electrically connected to the stub conductor via the power supply point that is disposed at one end side of the stub conductor.

* * * * *